US009003421B2

(12) United States Patent
Gabor et al.

(10) Patent No.: US 9,003,421 B2
(45) Date of Patent: Apr. 7, 2015

(54) ACCELERATION THREADS ON IDLE OS-VISIBLE THREAD EXECUTION UNITS

(75) Inventors: Ron Gabor, Raanana (IL); Gad Sheaffer, Haifa (IL); Avi Mendelson, Haifa (IL); Uri C. Weiser, Atlit (IL); Hong Wang, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 1322 days.

(21) Appl. No.: 11/288,823

(22) Filed: Nov. 28, 2005

(65) Prior Publication Data

US 2007/0124736 A1 May 31, 2007

(51) Int. Cl.
G06F 9/46 (2006.01)
G06F 9/30 (2006.01)
G06F 9/48 (2006.01)
G06F 9/50 (2006.01)

(52) U.S. Cl.
CPC .............. *G06F 9/4843* (2013.01); *G06F 9/461* (2013.01); *G06F 9/5027* (2013.01); *G06F 2209/5018* (2013.01)

(58) Field of Classification Search
CPC .......................... G06F 2209/5018; G06F 9/461
USPC .......................................... 718/108; 712/207
See application file for complete search history.

(56) References Cited

U.S. PATENT DOCUMENTS

| | | | |
|---|---|---|---|
| 6,931,641 B1 * | 8/2005 | Davis et al. .................... | 718/108 |
| 7,257,679 B2 * | 8/2007 | Clark ............................. | 711/141 |
| 7,404,067 B2 * | 7/2008 | Aamodt et al. ................ | 712/219 |
| 7,493,621 B2 * | 2/2009 | Bradford et al. .............. | 718/108 |
| 7,617,499 B2 * | 11/2009 | Bradford et al. .............. | 718/108 |
| 7,631,307 B2 * | 12/2009 | Wang et al. .................... | 718/100 |
| 2002/0007387 A1 * | 1/2002 | Ginsberg ........................ | 709/102 |
| 2002/0144083 A1 * | 10/2002 | Wang et al. ..................... | 712/23 |
| 2003/0023663 A1 * | 1/2003 | Thompson et al. ........... | 709/108 |
| 2003/0126186 A1 * | 7/2003 | Rodgers et al. ............... | 709/107 |
| 2004/0128489 A1 * | 7/2004 | Wang et al. .................... | 712/235 |
| 2004/0148491 A1 * | 7/2004 | Damron .......................... | 712/34 |
| 2005/0071438 A1 * | 3/2005 | Liao et al. ...................... | 709/214 |
| 2005/0071841 A1 * | 3/2005 | Hoflehner et al. ............ | 718/100 |
| 2005/0125802 A1 * | 6/2005 | Wang et al. .................... | 718/108 |

(Continued)

OTHER PUBLICATIONS

Boston University, "The Linux Kernel: Process Management", CS591, Spring 2001.*

(Continued)

*Primary Examiner* — Meng An
*Assistant Examiner* — James J Lee
(74) *Attorney, Agent, or Firm* — Blakely, Sokoloff, Taylor & Zafman LLP

(57) ABSTRACT

Disclosed are embodiments of a system, methods and mechanism for using idle thread units to perform acceleration threads that are transparent to the operating system. When the operating system scheduler has no work to schedule on the idle thread units, the operating system may issue a halt or monitor/mwait or other instruction to place the thread unit into an idle state. While the thread unit is idle, from the operating system perspective, the thread unit may be utilized to perform speculative acceleration threads in order to accelerate threads running on non-idle thread units. The context of the idle thread unit is saved prior to execution of the acceleration thread and is restored when the operating system requires use of the thread unit. The acceleration threads are transparent to the operating system. Other embodiments are also described and claimed.

20 Claims, 8 Drawing Sheets

(56) References Cited

U.S. PATENT DOCUMENTS

| | | | |
|---|---|---|---|
| 2005/0149936 A1* | 7/2005 | Pilkington | 718/102 |
| 2005/0149937 A1* | 7/2005 | Pilkington | 718/102 |
| 2005/0172292 A1* | 8/2005 | Yamada et al. | 718/105 |
| 2005/0273568 A1* | 12/2005 | Blandy | 711/170 |

OTHER PUBLICATIONS

Nakajima, Jun, "idle using PNI monitor/mwait", LWN.net, Eklektix, Inc., 2003.*

U.S. Appl. No. 11/173,326, entitled "A Mechanism for Instruction Set Based Thread Execution on a Plurality of Instruction Sequencers,", filed Jun. 30, 2005.

U.S. Appl. No. 11/134,687, entitled "A Programmable Event Driven Yield Mechanism Which May Activate Service Threads.", filed May 19, 2005.

U.S. Appl. No. 10/728,649, entitled "User-Programmable Low-Overhead Multithreading", filed Dec. 5, 2003.

R. Chappell, J. Stark, S. Kim, S. K. Reinhardt, and Y. Patt. Simultaneous subordinate microthreading (ssmt). In ISCA '99: Proceedings of the 26th annual international symposium on Computer architecture, pp. 186-195. IEEE Computer Society, 1999.

C. K. Luk. Tolerating memory latency through software-controlled pre-execution in simultaneous multithreading processors. In ISCA '01: Proceedings of the 28th annual international symposium on Computer architecture, pp. 40-51, New York, NY, USA, 2001. ACM Press.

A. Roth and G. S. Sohi. Speculative data-driven multithreading. In HPCA '01: Proceedings of the 7th International Symposium on High-Performance Computer Architecture (HPCA'01), p. 37. IEEE Computer Society, 2001.

J. G. Steffan, C. B. Colohan, A. Zhai, and T. C. Mowry. A scalable approach to thread-level speculation. In ISCA '00: Proceedings of the 27th annual international symposium on Computer architecture, pp. 1-12, New York, NY, USA, 2000. ACM Press.

N. Tuck and D. M. Tullsen. Multithreaded value prediction. In HPCA'05: Proceedings of the 11th International Conference on High Performance Computer Architecture, pp. 5-15. IEEE Computer Society, 2005.

S.Wallace, B. Calder, and D. M. Tullsen. Threaded multiple path execution. In ISCA '98: Proceedings of the 25th annual international symposium on Computer architecture, pp. 238-249. IEEE Computer Society, 1998.

* cited by examiner

*SMT*

*Multi-core of single-threaded cores*

*Multicore of SMT cores*

ACCELERATION THREADS ON IDLE OS-VISIBLE THREAD EXECUTION UNITS

BACKGROUND

1. Technical Field

The present disclosure relates generally to information processing systems and, more specifically, to utilize idle OS-managed hardware thread contexts to perform acceleration threads.

2. Background Art

In order to increase performance of information processing systems, such as those that include microprocessors, both hardware and software techniques have been employed. On the hardware side, microprocessor design approaches to improve microprocessor performance have included increased clock speeds, pipelining, branch prediction, superscalar execution, out-of-order execution, and caches. Many such approaches have led to increased transistor count, and have even, in some instances, resulted in transistor count increasing at a rate greater than the rate of improved performance.

Rather than seek to increase performance strictly through additional transistors, other performance enhancements involve software techniques. One software approach that has been employed to improve processor performance is known as "multithreading." In software multithreading, an instruction stream may be divided into multiple instruction streams that can be executed concurrently. Alternatively, multiple independent software streams may be executed in concurrently.

Increasingly, multithreading is supported in hardware. For instance, in one approach, processors in a multi-processor system, such as a chip multiprocessor ("CMP") system, may each act on one of the multiple software threads concurrently. In another approach, referred to as simultaneous multithreading ("SMT"), a single physical processor is made to appear as multiple logical processors to operating systems and user programs. For SMT, multiple software threads can be active and execute concurrently on a single processor without switching. That is, each logical processor maintains a complete set of the architecture state, but many other resources of the physical processor, such as caches, execution units, branch predictors, control logic and buses are shared. For SMT, the instructions from multiple software threads thus execute concurrently on each logical processor.

For a system that supports concurrent execution of multiple threads, such as SMT and/or CMP systems, an operating system may control scheduling and execution of the software threads on thread execution resource(s) that are visible to the operating system. Often-times, especially for single-threaded code, one or more of these thread execution resources may remain idle during execution of code on the multithreaded system.

BRIEF DESCRIPTION OF THE DRAWINGS

Embodiments of the present invention may be understood with reference to the following drawings in which like elements are indicated by like numbers. These drawings are not intended to be limiting but are instead provided to illustrate selected embodiments of apparatuses, systems and methods to schedule speculative or non-speculative acceleration threads during idle cycles of an OS-managed thread execution unit.

DETAILED DESCRIPTION

The following discussion describes selected embodiments of methods, systems and mechanisms to utilize idle OS-managed thread execution units to run speculative or non-speculative acceleration threads. Typically, during execution of a single-threaded application or during execution of any other application that requires fewer concurrent threads than are available in a multithreaded system, thread units may remain idle because the operating system has no work to schedule on them. That is, the thread units are in an idle state, waiting for work to become available. Described herein is an approach for utilizing this idle time for useful work by executing speculative or non-speculative threads that the operating system does not manage. The apparatus, system and method embodiments described herein may be utilized with single-core or multi-core multithreading systems.

In the following description, numerous specific details such as multithreading environments, system configurations, numbers and topology of sequencers in a multi-sequencer system, sequence of operations of a method, and microarchitectural structures have been set forth to provide a more thorough understanding of embodiments of the present invention. It will be appreciated, however, by one skilled in the art that the invention may be practiced without such specific details. Additionally, some well known structures, circuits, and the like have not been shown in detail to avoid unnecessarily obscuring the present invention.

As used herein, a thread unit, also interchangeably referred to herein as a "sequencer", is a distinct thread execution resource and may be any physical or logical unit capable of executing a thread. It may include next instruction pointer logic to determine the next instruction to be executed for the given thread. A sequencer may be a logical thread unit or a physical thread unit. Such distinction between logical and physical thread units is discussed immediately below in connection with FIG. 1.

Figure 1:
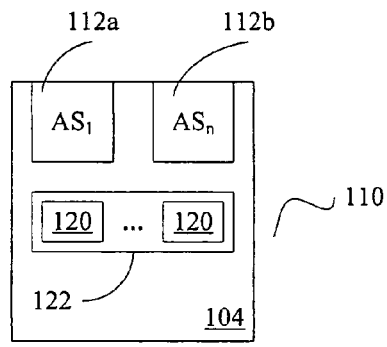
FIG. 1 is a block diagram illustrating various embodiments of multi-sequencer systems.
Figure 1:
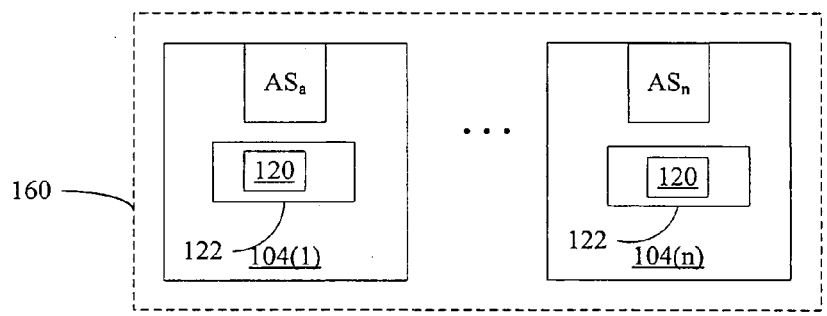
Figure 1:
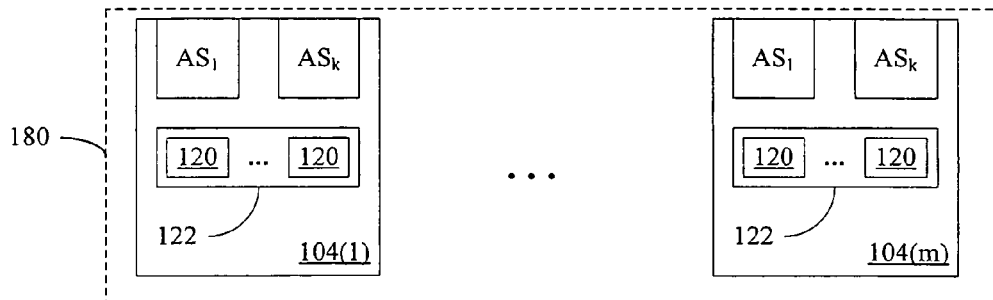

FIG. 1 is a block diagram illustrating selected features of embodiments 110, 150, 170 of multi-sequencer systems that support the notion of utilizing idle OS thread units to run acceleration threads. FIG. 1 illustrates selected features of an SMT multi-sequencer multithreading processor core 10, where each sequencer is a logical processor that may execute a thread concurrently with execution of other threads on other logical processors of the core 110.

FIG. 1 also illustrates selected features of multiple-core multithreading systems 150, 170. The physical cores for a multi-core multithreading system may be either single-sequencer cores (see, e.g., system 150) or may be multi-sequencer cores (see, e.g., system 170). Such multi-core multithreading embodiments are discussed later, below, while the single-core multi-sequencer processor 110 is discussed immediately below.

For the SMT processor core 10, a single physical processor 104 is made to appear as multiple thread contexts, referred to herein as $TC_1$ through $TC_n$ (not shown). Each of the n thread contexts is effectively a sequencer. When at least some of these thread contexts (e.g. m out of n) are made visible to the operating system and/or user programs, these thread contexts are sometimes referred to as logical processors (not shown), and are referred to herein as $LP_1$ through $LP_m$. Each thread context $TC_1$ through $TC_n$ maintains a set of the architecture state $AS_1$ (112a)-$AS_n$(112b), respectively. The architecture state includes, for at least one embodiment, data registers, segment registers, control registers, debug registers, and most of the model specific registers. The thread contexts $TC_1$-$TC_n$ share most other resources of the physical processor 104, such as caches, execution units, branch predictors, control logic and buses.

Although such features may be shared, each thread context in the multithreading processor core 110 can independently generate the next instruction pointer address value (and perform, for instance, a fetch from an instruction cache, an execution instruction cache, or trace cache). Thus, the processor 104 includes logically independent next-instruction-pointer and fetch logic 120 to determine an instruction pointer value for a next instruction to be executed by the thread context and fetch instructions for each thread context, even though the multiple logical sequencers may be implemented in a single physical fetch/decode unit 122. For an SMT embodiment, the term "sequencer" encompasses at least the next-instruction-pointer and fetch logic 120 for a thread context, along with at least some of the associated architecture state, AS, for that thread context. It should be noted that the sequencers of an SMT processor core 110 need not be symmetric. For example, two SMT sequencers of the same physical processor 104 may differ in the amount of architectural state information that they each maintain.

FIG. 1 also illustrates at least two embodiments of multi-core multithreading systems 150, 170. For at least some embodiments of the multi-core system 150, 170 illustrated in FIG. 1, the system may use a processor 104 as a building block. Each of the "sequencers" may be a processor core 104, with the multiple cores $104_1$-$104_n$, $104_1$-$104_m$ residing in a single chip package 160, 180, respectively. For system 150 illustrated in FIG. 1, each core $104_i$ (i=0 to n) may be a single-threaded sequencer. For the system 170 illustrated in FIG. 1, each core $104j$ (j=1 to m) may be a multi-sequencer processor core.

The chip packages 160, 180 are denoted with broken lines in FIG. 1 to indicate that the illustrated single-chip embodiments of multi-core systems 150, 170 are illustrative only. For other embodiments, processor cores of a multi-core system may reside on separate chips, or may be organized as an SOEMT multi-sequencer system.

A first multi-core multithreading system 150 illustrated in FIG. 1 may include two or more separate physical processors $104_1$-$104_n$ that is each capable of executing a different thread such that execution of at least portions of the different threads may be ongoing at the same time. Each processor $104_1$ through $104_n$ includes a physically independent fetch unit 122 to fetch instruction information for its respective thread. In an embodiment where each processor $104_1$-$104_n$ executes a single thread, the fetch/decode unit 122 implements a single next-instruction-pointer and fetch logic 120.

FIG. 1 also illustrates a multi-core multithreading system 170 that includes multiple SMT processor cores $104_1$-$104_m$. For such embodiment 170, each processor $104_1$-$104_m$ supports multiple thread contexts. For example, each processor $104_1$-$104_m$ is an SMT processor that supports k sequencers such that the system 170 effectively implements m*k sequencers. The fetch/decode units 122 for the system 170 implements distinct next-instruction-pointer and fetch logic 120 for each supported thread context.

Figure 2:
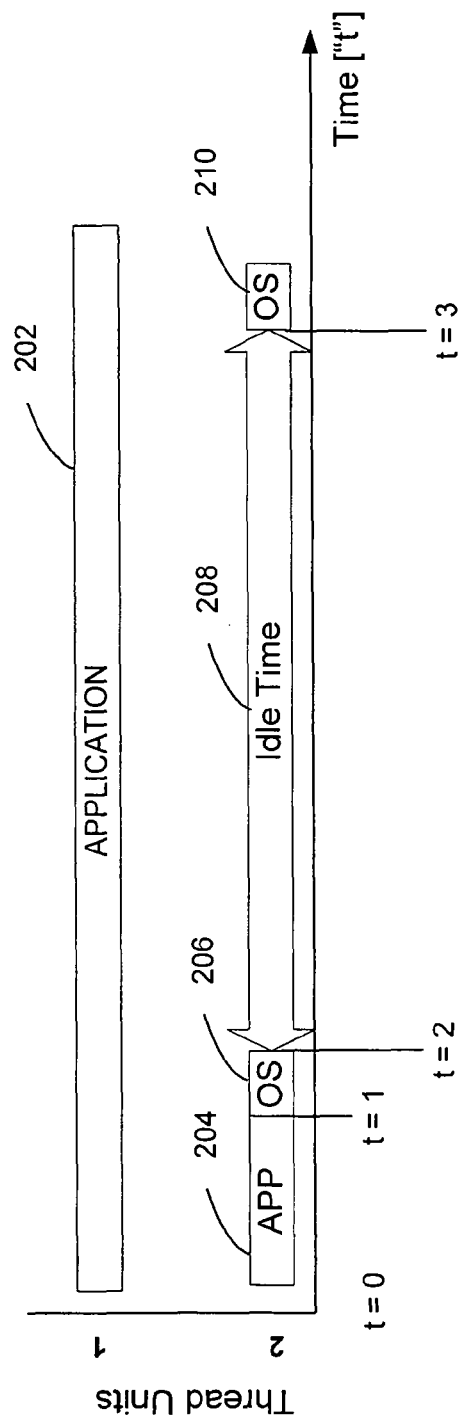
FIG. 2 is a timing diagram that presents a graphic representation of thread unit utilization during execution of sample user-level code

Reference is now made to FIG. 2. FIG. 2 is a block timing diagram illustrating a graphic representation of thread unit utilization during execution of sample user-level code. For the example illustrated in FIG. 2, each of thread unit 1 and 2 may be logical processors of the same SMT core. For other embodiments, thread units 1 and 2 may be two separate cores, or may be logical processors from different cores.

FIG. 2 illustrates that one portion of user-space application code 202 may run on thread unit 1 and that another portion of user-space code 204 may run on thread unit 2. Such code 202, 204 is visible to an operation system (not shown) and is subject to various OS activity such as scheduling and interrupts. The two portions of application code 202, 204 illustrated in FIG. 2 may be different threads for the same process, or may be code from different processes. Either way, the code portions 202, 204 represent OS-managed threads that may be executed concurrently.

The thread units 1 and 2 illustrated in FIG. 2 are each capable of concurrently executing a thread associated with its respective application code 202, 204. Such threads are sometimes referred to herein as "OS threads", to denote that they are created, managed and scheduled by the OS(not shown).

FIG. 2 thus illustrates a plurality of thread units (thread unit 1 and thread unit 2) to concurrently execute a plurality of threads that are managed by an operating system. Although the FIG. 2 illustration could be interpreted to show that each of the thread units 1 and 2 executes a thread associated with a separate user application 202, 204, such illustration should not be taken to be limiting. Embodiments of the approach, discussed herein, for utilizing idle thread units to perform speculative or non-speculative acceleration threads may prove beneficial even when applied to a single multi-threaded user program.

The user threads executed on thread units 1 and 2 may thus be created, managed and scheduled by the OS. Regarding scheduling of the user threads, the OS may include a scheduler that schedules the threads for execution, and places the thread units into an idle state if the scheduler has no work for the thread unit to perform.

FIG. 2 illustrates that the user-space application code 204 running on thread unit 2 completes execution at time t=1, while thread unit 1 is still executing the other application code 202. Between time t=1 and time t=2, the OS may perform certain tasks 206 that may include a) determining that it currently has no further work to schedule on thread unit 2 and b) issuing an instruction to place thread unit 2 into an idle state.

For at least one embodiment, the work 206 that the OS performs between time t=1 and t=2 may include issuing a halt instruction that stops all instruction execution on thread unit 2 and places thread unit 2 into a halt state. At time t=2, thread unit 2 thus enters a halt state 208 during which it is idle.

Another type of instruction that may be issued during the OS work 206, rather than a halt instruction, is a monitor and mwait instructions pair. Software, such as an operating system scheduler, can use the monitor and mwait instructions to hint that a thread is not doing useful work (e.g., spinning and waiting for work). The sequencer may then go into a low-power and performance-optimized state. Monitor and mwait provide a way for software to wake up the processor from this low-power/performance-optimized state via a store to a specified memory location (such as, e.g., a store to the work queue).

The monitor instruction may set up hardware to detect stores to an address range. A store to the address range will set the monitor event pending flag. Other events will also set the monitor event pending flag, including interrupts or any event that may change the page tables.

Mwait puts the sequencer into an idle state (which may be a low-power or otherwise optimized state) until a store, to any byte in the address range being monitored, is detected, or if there is an interrupt, exception, or fault that needs to be handled. There may also be other time-outs or implementation-dependent conditions that may cause the processor to exit the optimized state. The mwait instruction is architecturally identical to a nop instruction. It is effectively a hint to the sequencer to indicate that the sequencer may choose to enter an implementation-dependent optimized idle state while waiting for an event or for a store to the address range set up by the preceding monitor instruction in program flow. For example, an SMT logical processor may enter an idle state that allows the other thread to execute faster, or it may enter a state that allows for lower power consumption, or both.

For at least one of the embodiments discussed herein, it is assumed that an operating system will use the monitor and mwait instructions to perform idle loop handling for sequencers on which it has no work to be scheduled.

FIG. 2 illustrates that the operating system may cause thread unit 2 to exit the idle state at time t=3. This may be performed in any of several manners, including issuance of an interrupt or by writing to a location being monitored in response to a previous monitor instruction. FIG. 2 illustrates that, at time t=3, the operating system may thus begin processing 210 to cause thread unit 2 to resume instruction execution. For at least one embodiment, for example, such processing 210 could be performed by scheduler code of the operating system.

Figure 3:
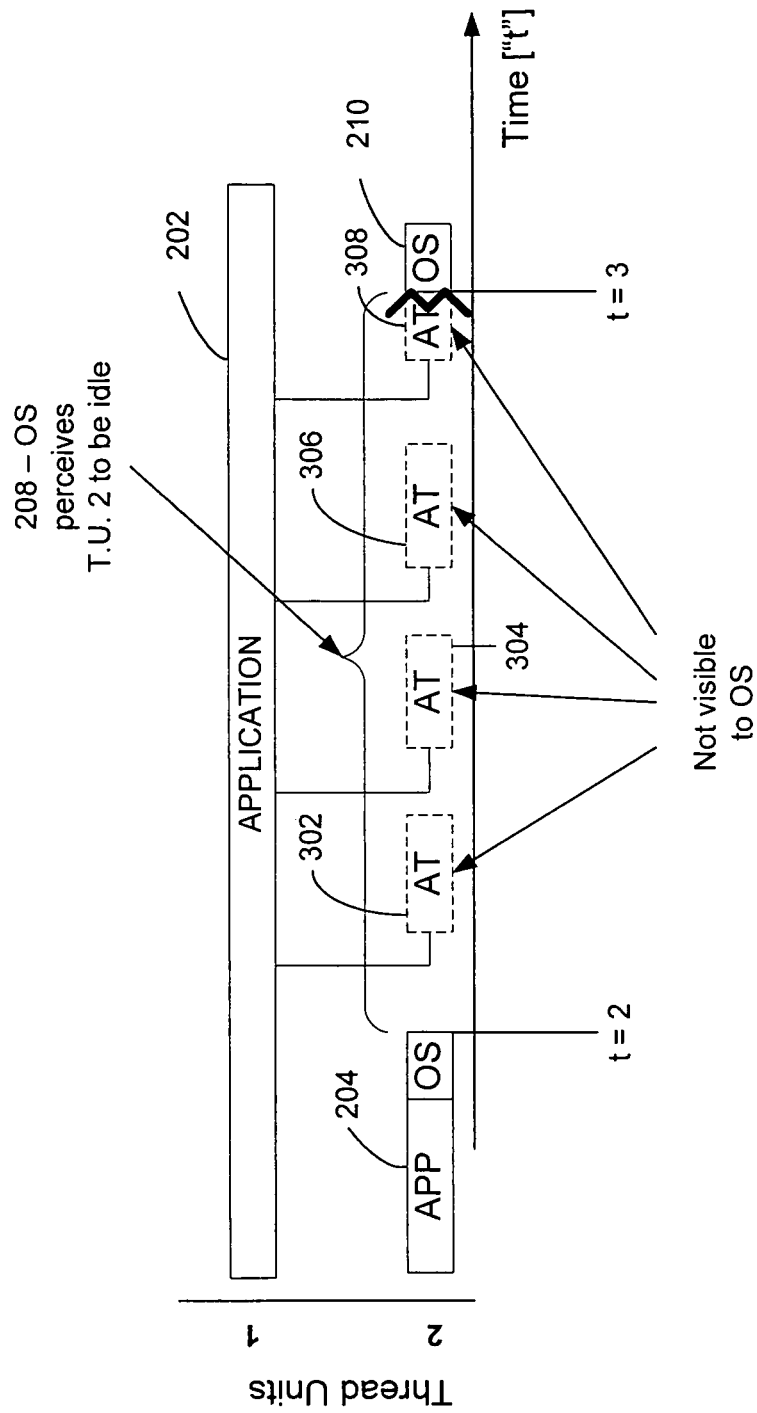
FIG. 3 is a timing diagram that presents a graphic representation of thread unit utilization during execution of acceleration threads.

FIG. 3 is a timing diagram that illustrates that, during idle time 208 illustrated in FIG. 2, thread unit 2 may be utilized to perform other work. During such time, the operating system perceives thread unit 2 to be in the idle state. FIG. 3 illustrates that, during idle time 208, processing cycles may be "stolen" from the idle thread unit (thread unit 2) in order to execute one or more acceleration threads ("AT") 302, 304, 306, 308. Such acceleration threads 302, 304, 306, 308 may be speculative threads that are designed to help accelerate execution of other threads, or non-speculative threads that were put into the software in case extra schedulers become available. For example, an acceleration thread may be executed in order to perform data prefetching for another thread in order to, hopefully, avoid long-latency cache misses in the other thread. As used herein, the "acceleration thread" is not visible to the operating system and executes one or more tasks that, hopefully, helps accelerate execution of another thread. The other thread may be referred to as an "accelerated thread."

The acceleration threads are designed to enhance performance but do not affect program correctness. Therefore they are not guaranteed to complete execution (see AT 308) nor, for that matter, are they guaranteed to even begin to execute at all.

FIG. 3 illustrates that the operating system is unaware of the acceleration thread activity and, instead, perceives thread unit 2 to be in an idle state 208 between times t=2 and t=3. FIG. 3 illustrates that, when the OS needs the thread unit again, the acceleration immediately stops. FIG. 3 shows that, at time t=3, the operating system begins to performs activity 210 in order to bring thread unit 2 out of the idle state. Such activity 210 may include, for at least one embodiment, an interrupt or, for another embodiment, a write to a monitored memory address or location. At such time (t=3), acceleration thread 308 is dropped when the interrupt to thread unit 2 arrives.

One of skill in the art will recognize that any of several approaches may be used in order to attempt to accelerate other threads that are running on non-idle sequencers. The techniques discussed herein for harnessing cycles from idle sequencers to perform acceleration do not focus on the details of such acceleration approaches. Instead, the focus herein is on apparatus, system and method embodiments for detecting when to apply such acceleration approaches and how to apply them in a manner that is transparent to the operating system. The focus herein is not on the details of the acceleration approaches themselves.

Figure 4:
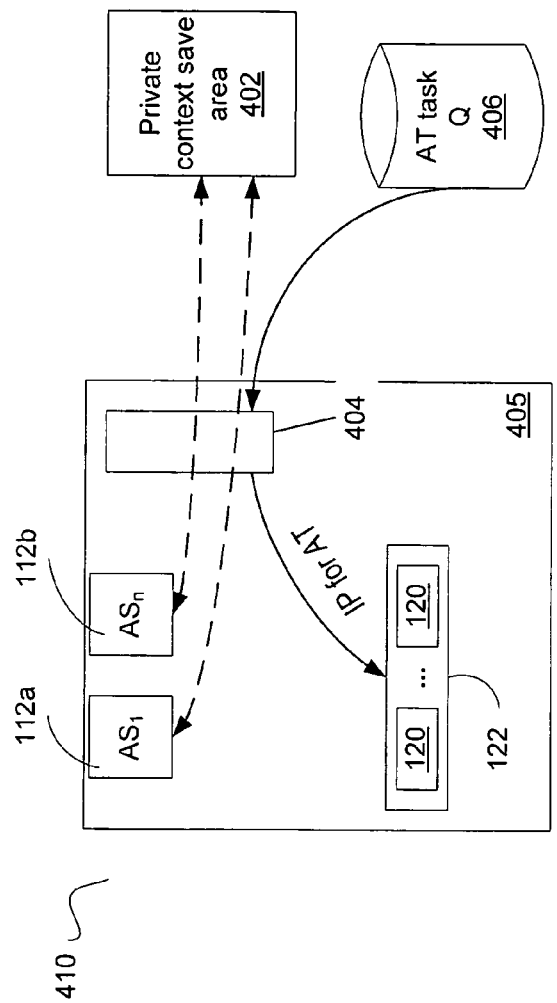
FIG. 4 is a block diagram illustrating at least one embodiment of a system to detect and utilize idle OS-managed processors to execute acceleration threads that are transparent to the operating system.

FIG. 4 is a block diagram illustrating at least one embodiment of a system 410 to detect and utilize idle OS-managed processors to execute acceleration threads that are transparent to the operating system (not shown). FIG. 4 illustrates that the system 410 may include a processor 405, a private context save area 402 and an acceleration thread task queue 406. Although FIG. 4 illustrates an SMT processor core 405, one of skill in the art will recognize that the private context save area 402 and task queue 406 may be utilized in the substantially the same manner as described below for alternative systems that include multiple single- or multi-threaded cores that each execute multiple concurrent OS-managed threads. FIG. 4 is discussed herein in conjunction with FIG. 5.

Figure 5:
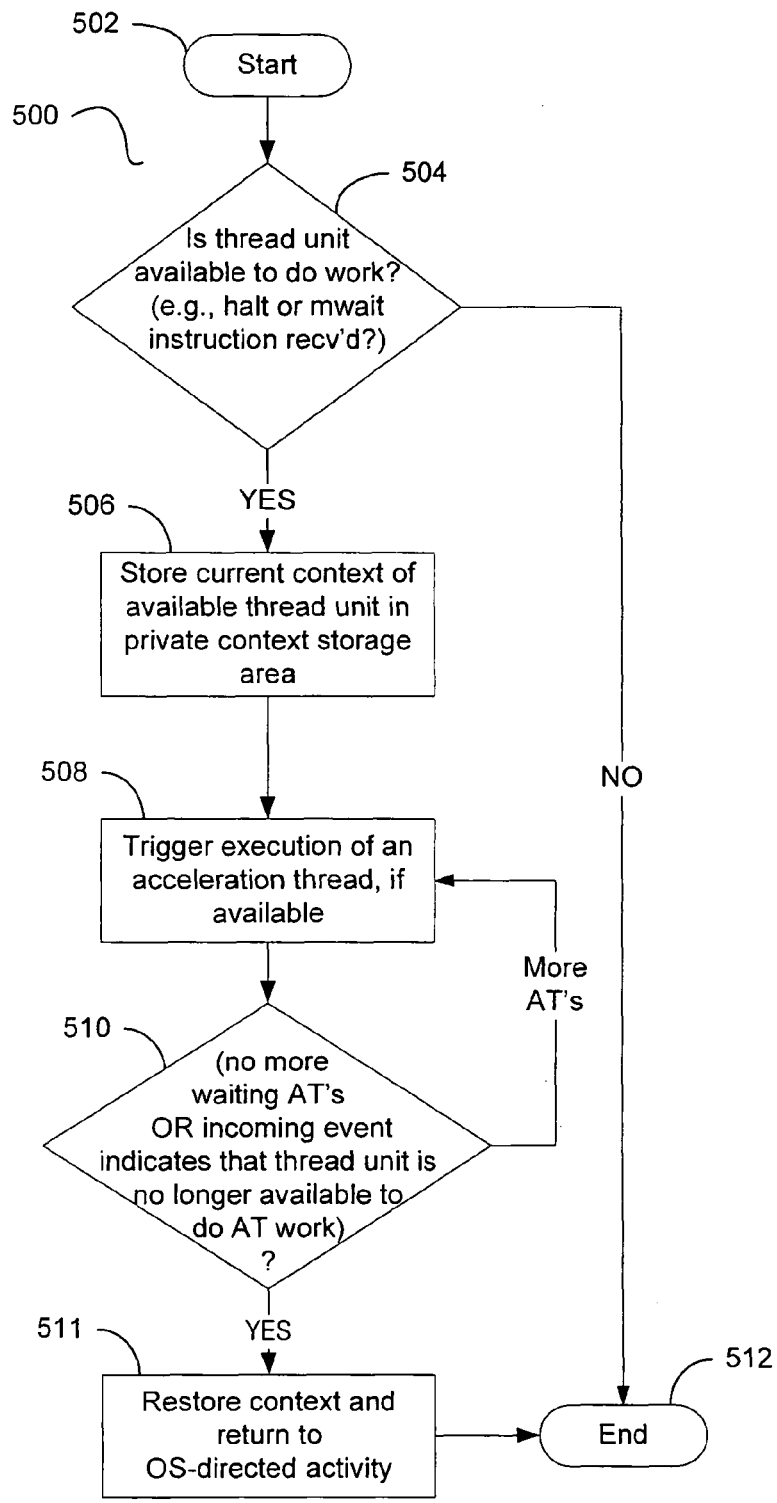
FIG. 5 is a flowchart illustrating at least one embodiment of a high-level method for detecting and utilizing idle sequencers for thread acceleration.

FIG. 5 is a flowchart illustrating at least one embodiment of a high-level method 500 for detecting and utilizing idle sequencers for thread acceleration. Generally, the method 500 detects when an OS-managed sequencer becomes idle, schedules an acceleration thread to run on the sequencer while it is idle, detects when the sequencer is demanded again by the OS scheduler, and drops the acceleration thread when the sequencer is demanded again. In this manner, the method 500 provides for acceleration threads without intervention of an operating system scheduler.

FIG. 5 illustrates that the method begins at block 502 and proceeds to block 504. At block 504, the method determines whether a sequencer is idle, and therefore available to perform acceleration work. For at least one embodiment, a determination at block 504 that the sequencer is available is made in response to a halt or monitor/mwait being issued to the sequencer. If the sequencer is determined at block 504 to be available, processing proceeds to block 506.

If the sequencer is not available to perform acceleration work, the rest of the method 500 is not performed for this sequencer, and processing ends at block 512. However, one of skill in the art will realize that the same method 500 may be performed for the other sequencers in a multi-threaded system as well.

For at least one embodiment, the determination at block 504 may be performed by an acceleration unit 404 as illustrated in FIG. 4. The acceleration unit may perform the determination in any of several manners. For at least one embodiment, the determination at block 504 is performed responsive to receipt of a halt or monitor/mwait instruction. The acceleration unit 404 includes dedicated logic to trigger execution of a speculative thread on the idle thread unit without intervention of the operating system. The triggering may be performed responsive to receipt of a halt or monitor/mwait instruction by the sequencer in the following manner.

The operating system may issue a halt or monitor/mwait instruction pair to a sequencer if it determines that it has no available work to schedule on the sequencer. Upon receipt of the halt or monitor/mwait instruction, the sequencer may decode the instruction. For at least one embodiment, the dedicated logic of the acceleration unit 404 may be in the form of microcode, a sequence of instructions stored in read-only memory (ROM) of the processor 405, or may be in the form of "mini-code"—a software function that is invoked by microcode. Any other mechanism that provides for triggering an acceleration thread in response to receipt of a halt or mwait instruction may also be employed by the logic of the acceleration unit 404, including hardware circuitry mechanisms.

Upon decoding of the halt or monitor instruction, the microcode or mini-code may be invoked. This invocation results in the determination at block 504 in FIG. 5 to evaluate to "true."

At block 506, a context save operation occurs. Such context save operation 506 may be performed by the acceleration unit 404. During the context save operation at block 506, all or some of the context information for the idle OS-managed thread is saved to a private context save area 402. This private context save area 402 is used to save the context information for an OS thread that gets switched out when idle in order to make way for an acceleration thread. For at least one embodiment, the private context save area 402 is a portion of on-die memory that isn't visible externally.

Alternatively, while this private context save area 402 could be a discrete and separate area of memory, it need not necessarily be so in all embodiments. For example, the private context save area 402 is, for at least one embodiment, part of the existing cache hierarchy. It is implemented with a single bit in a cache line, where a certain value of the bit indicates that the saved context data is "hidden" and is not snoopable.

For at least one embodiment, all context state for the idle OS thread is saved in the private context save area 402 at block 506. For an alternative embodiment, however, only part of the context is saved. For example, for an SMT core, if acceleration thread is used to accelerate a thread on the same physical processor (core), some state can be shared among the acceleration thread and the accelerated thread. This shared state may include, for example, values related to the floating point mode. The value of the idle OS threads, which is not overwritten, need not be part of the saved context.

Thus, for embodiments where only logical processors of the same SMT core may be used to accelerate other threads executing on the same core, for example, some state may be shared between the accelerated and acceleration threads. For such cases, the shared state need not be saved during the context save operation at block 506.

For another alternative embodiment, the private context save area 402 is a shadow copy of the context state. For such embodiment, the context save operation at block 506 is merely an operation to switch a pointer from the current copy of the OS state (that is, for the OS-managed thread that has become idle) to point to a shadow copy of the state to be used during execution of the acceleration thread(s) while the OS-managed sequencer remains idle (from the OS point of view).

After the context save operation is completed at block 506, processing of the method 500 proceeds to block 508. At block 508, an acceleration thread is triggered. For at least one embodiment, triggering of the acceleration thread is again performed by the acceleration unit 404 and may, in particular, be performed in response to an instruction that indicates a thread unit could use an acceleration thread, for example, to prefetch data. Regardless of the specific implementation of the triggering logic within the acceleration unit 404 (e.g., microcode, mini-code, hardware circuit, etc.), it should be understood that the triggering occurs without OS intervention and that such triggering is transparent or "invisible" to the OS. The operating system is therefore unaware of the execution of the acceleration thread(s) so triggered.

For at least one embodiment, the triggering at block 508 is accomplished as follows. The triggering logic of the acceleration unit 404 may consult a task queue 406 to determine if any acceleration threads are pending. If so, the triggering logic may query an entry from the task queue 406. The entry may include an instruction pointer (IP) that provides the starting address for an acceleration thread as well as some state required for its execution (e.g. control registers). The acceleration unit 404 may pop the entry from the task queue and provide this IP to the idle sequencer's next-instruction-pointer and fetch logic 120. Execution of the acceleration thread may then begin as the next instruction to be executed after receipt of the halt or mwait instruction.

It should be noted that, as long as the sequencer remains idle, additional acceleration threads may be executed at block 506. Such additional execution may be facilitated by instructions embedded at the end of an acceleration thread, which causes a new acceleration thread to be popped off the queue 406, and for the instruction pointer for the new acceleration thread to be provided to the idle sequencer's next-instruction-pointer and fetch logic 120.

FIG. 5 illustrates that processing proceeds from block 508 to block 510. Block 510 checks for any terminating condition that may cause the acceleration thread to be dropped and for the original OS-managed thread to be resumed. Such termination may occur, for example, if there are no acceleration threads pending in the queue 406. Similarly, if, for example, the OS issues an instruction to cause the "idle" sequencer to exit from the idle state, then the determination at block 510 evaluates to "true". If more acceleration threads are pending in the queue 406, and no terminating instruction has been received, processing loops back to block 508 in order to perform more acceleration work. If, however, either no more acceleration threads are pending or a termination instruction has been received, processing proceeds from block 510 to block 511.

At block 511, the context of the OS-visible thread is restored from the private context save area 402 and the sequencer returns to OS-directed work. The context restoration may be performed by context restore logic of the acceleration unit 404. Processing then ends at block 512.

The method 500 discussed above assumes that any thread that could benefit from acceleration may place a pending acceleration thread into the queue 406. Any manner of doing so may be employed, and many specific details about such processing are beyond the scope of this disclosure. Various details regarding embodiments for at least one approach for such processing may be found in copending U.S. patent application Ser. No. 11/173,326, entitled "A Mechanism For Instruction Set Based Thread Execution On A Plurality Of Instruction Sequencers," and Ser. No. 11/134,687, entitled "A Programmable Event Driven Yield Mechanism Which May Activate Service Threads."

According to such approach, a scenario may be defined for one or more events that indicate that acceleration may be desirable. If such scenario is satisfied during execution of a thread, a user-level interrupt may be generated for that thread. For at least one embodiment, these events may include one or more long-latency cache misses or encountering a low-confidence branch, just to name two out of many possibilities.

Responsive to the occurrence of such events as defined in the scenario, the thread unit may execute user-level handler code. The user-level handler code, invoked responsive to the user-level interrupt, may generate an instruction pointer to indicate the desired starting address for the acceleration thread. Such acceleration thread may, for example, speculatively run ahead of the thread that triggered the user-level interrupt, looking for prefetch opportunities. Or, for example, the acceleration thread may perform eager execution for a low-confidence or difficult-to-predict branch instruction. The instruction pointer may be part of an entry that is placed into the AT task queue 406. In such manner, a thread may request an acceleration thread by placing an entry into the AT task queue 406, which holds an entry for each pending AT thread that has been requested.

Figure 6:
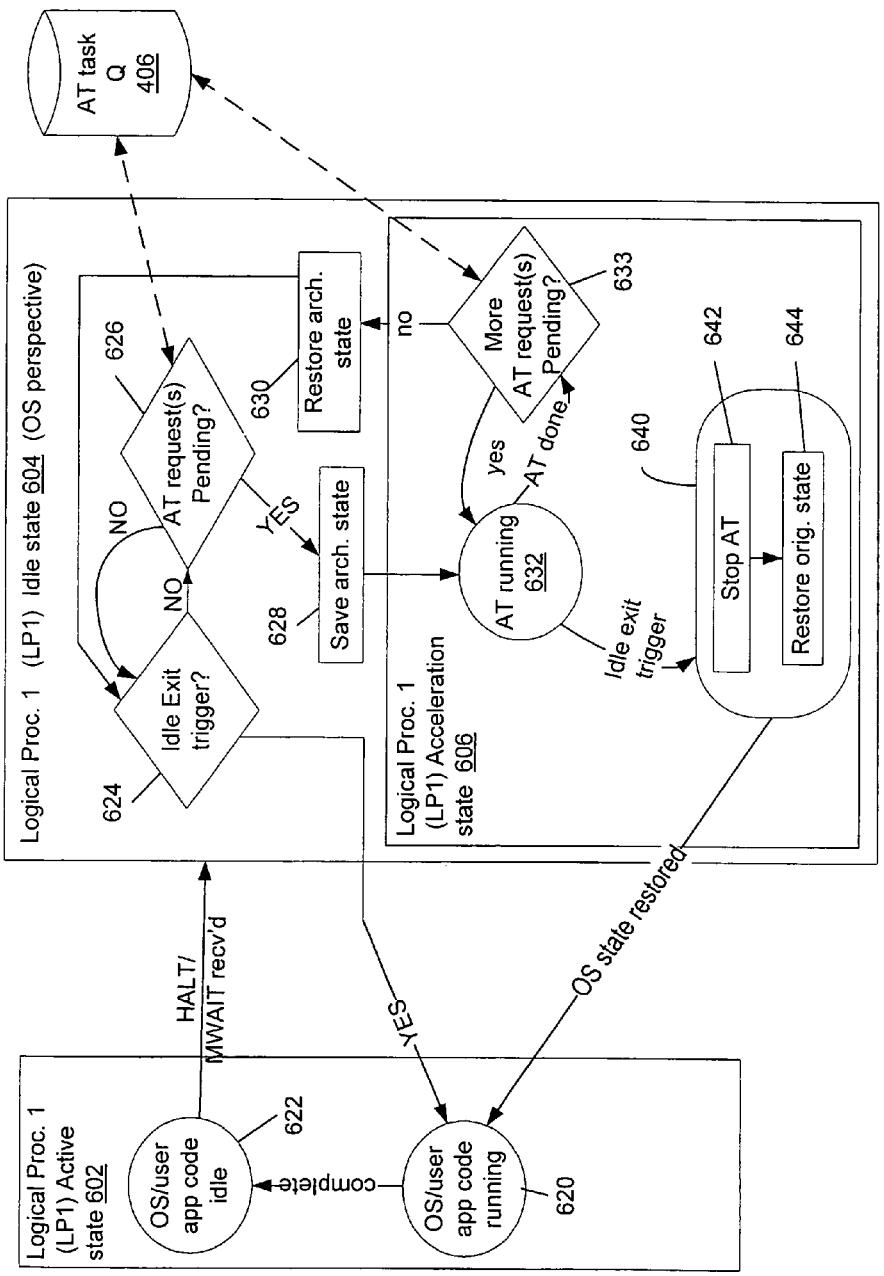
FIG. 6 is a data flow and state transition diagram illustrating state transitions for at least one embodiment of a method to utilize idle thread units for execution of acceleration threads.

FIG. 6 is a data flow and state transition diagram illustrating state transitions for at least one embodiment of the method 500 discussed above. FIG. 6 illustrates, generally, the transition of a sequencer, referred in FIG. 6 as logical processor 1 (LP1), from an active state 602 to an idle state 604 (from the OS point of view) during which acceleration threads may be run, and back to the active state 602 when a terminating instruction or event is received.

FIG. 6 illustrates that LP1 may run application code during state 620 of an active state 602. LP1 may transition from state 620 to an inactive state 622 when it has completed the OS-scheduled work that has been scheduled on it. When the operating system (not shown), detects that LP1 is in the inactive state 622, it may issue a halt or monitor/mwait instruction.

FIG. 6 illustrates that LP1 transitions from the active state 602 to an idle state 604 responsive to the halt or monitor/mwait instruction. While the OS perceives LP1 to be in the idle state 604, LP1 may determine at block 624 whether an instruction or event to trigger exit from the idle state 604 has been received. As is explained above, the exit trigger may be an interrupt, a write to a monitored memory location, etc.

If the exit trigger has been received, then LP1 transitions back to the instruction execution state 620 of the active state 602.

If the exit trigger has not been received, then processing proceeds from block 624 to block 626. At block 626, the AT task queue 406 is queried to determine if any AT requests are pending. If not, processing loops back to block 624. If, however, an AT request is pending in the queue 406, processing proceeds to block 628.

At block 628, context for LP1 is saved. For at least one embodiment, the context may be saved in a private storage area as described above in connection with private context save area 402 of FIG. 4 and in connection with block 506 of FIG. 5. From block 628, LP1 transitions into an acceleration state 606, while the OS still perceives the sequencer to be in idle state 604.

In the acceleration state 606, the sequencer LP1 pops a pending AT entry off the AT task queue 406 and begins executing the acceleration thread during AT running state 632. If an exit trigger is received by LP1 during state 632, the sequencer transitions to exit state 640. If, instead, the acceleration thread is executed to completion, then LP1 transitions to block 633.

At block 633, it is determined whether any additional acceleration threads remain pending in the AT task queue 406. If so, another AT entry is popped from the queue, and the sequencer LP1 re-enters the AT running state 632 to execute the new acceleration thread. If, however, there are no additional AT requests pending in the AT task queue 406, then LP1 transitions out of the acceleration state 506 and processing proceeds to block 630. At block 630, the state that was saved at block 628 is restored, and processing proceeds to block 624.

As is stated above, if an idle exit trigger is received while the sequencer LP1 is executing the acceleration thread at state 632, then LP1 transitions from state 632 to an exit state 640. During the exit state 640, the sequencer LP1 stops executing the acceleration thread at bock 642, and restores the architectures state, at block 644, that was saved at block 628. When the original OS state has been restored, the sequencer LP1 transitions back to the instruction execution state 620 of the active state 602.

Figure 7:
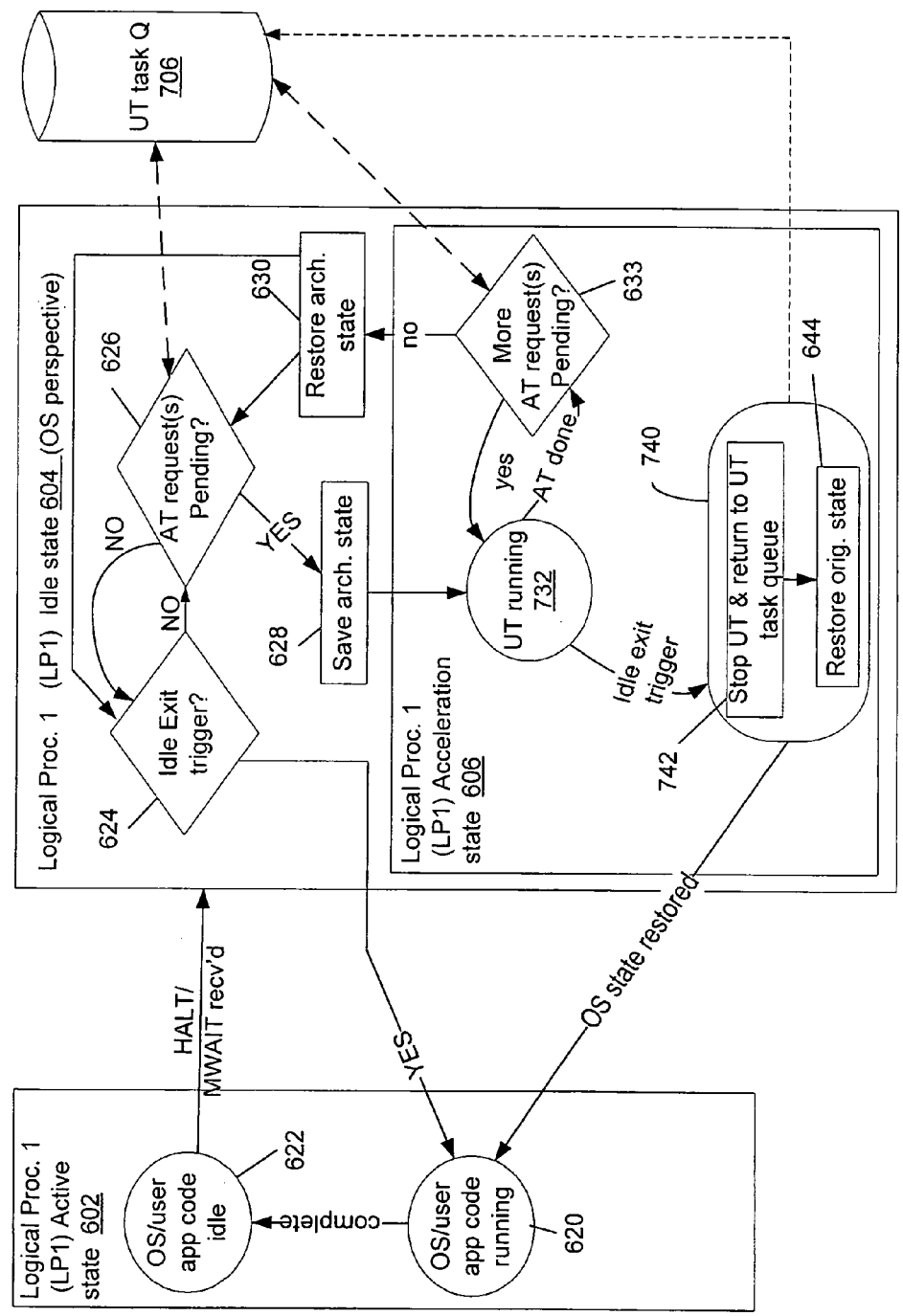
FIG. 7 is a data flow and state transition diagram illustrating state transitions for at least one other embodiment of a method to utilize idle thread units for execution of acceleration threads.

FIG. 7 is a data flow and state transition diagram illustrating state transitions for at least one other embodiment of the method 500 discussed above. The embodiment illustrated in FIG. 7 may be utilized for systems that provide a user-level scheduler to schedule work on sequencers that are not controlled by the operating system and on which the operating system does not schedule work (these sequencers may be referred to as "OS-sequestered sequencers"). On some systems, such a scheduler is able to schedule work only on the OS-sequestered sequencers, and may not schedule work on OS-controlled sequencers, even if the OS does not currently have any work to schedule on the OS-visible sequencers. The embodiment illustrated in FIG. 7 allows a user-level scheduler to schedule work on these OS-controlled sequencers when they would otherwise be idle.

Unless otherwise set forth below, similar processing is performed for elements bearing the same reference numerals in FIGS. 6 and 7. Thus, many of the states and blocks shown in FIG. 7 operate as discussed above in connection with FIG. 6.

FIG. 7 illustrates, however, that pending AT requests are stored in a user-level thread ("UT") task queue 706. Rather than solely holding requests for acceleration threads, the UT task queue 706 may also hold entries for other user-level threads that are waiting to be scheduled by the user-level scheduler (not shown). In this respect, an AT request is treated just like any other user-level thread to be scheduled by the user-level scheduler. Such user-level threads are scheduled without intervention of an operating system scheduler. They may be scheduled on the available sequestered sequencers using a round-robin approach or any other resource-sharing approach. If a user-level thread has not completed execution when it is time for a different user-level thread to have access to the sequencer according to the resource-sharing approach (e.g., round-robin, etc.), then the remainder of the user-level thread is placed back into the UST task queue 706 to await its next turn for scheduling.

FIG. 7 illustrates that when the sequencer LP1 transitions from the active state 602 to the idle state 604, it becomes, essentially, another resource (along with the OS-sequestered sequencers) on which the user-level scheduler may schedule work. At state 732, the next user-level thread is popped off the queue 706 and is executed. If an exit trigger is received during execution of the user-level thread at state 732, the sequencer LP1 transitions to exit state 740. At state 740, the sequencer LP1 stops executing the user-level thread at block 742. Also at block 742, the sequencer LP1 places an entry for the remainder of the user-level thread back into the UT task queue 706. Processing then proceeds to block 644, where the state is restored as described above. When the original state has been restored, the sequencer LP1 transitions back to the instruction execution state 620 of the active state 602.

The mechanism and method embodiments and techniques discussed herein may be implemented on any multi-sequencer system, including a single-core SMT system (see, e.g., 110 of FIG. 1) and a multi-core system (see, e.g., 150 and 170 of FIG. 1). Further discussion of such systems is discussed below in connection with FIG. 8.

Figure 8:
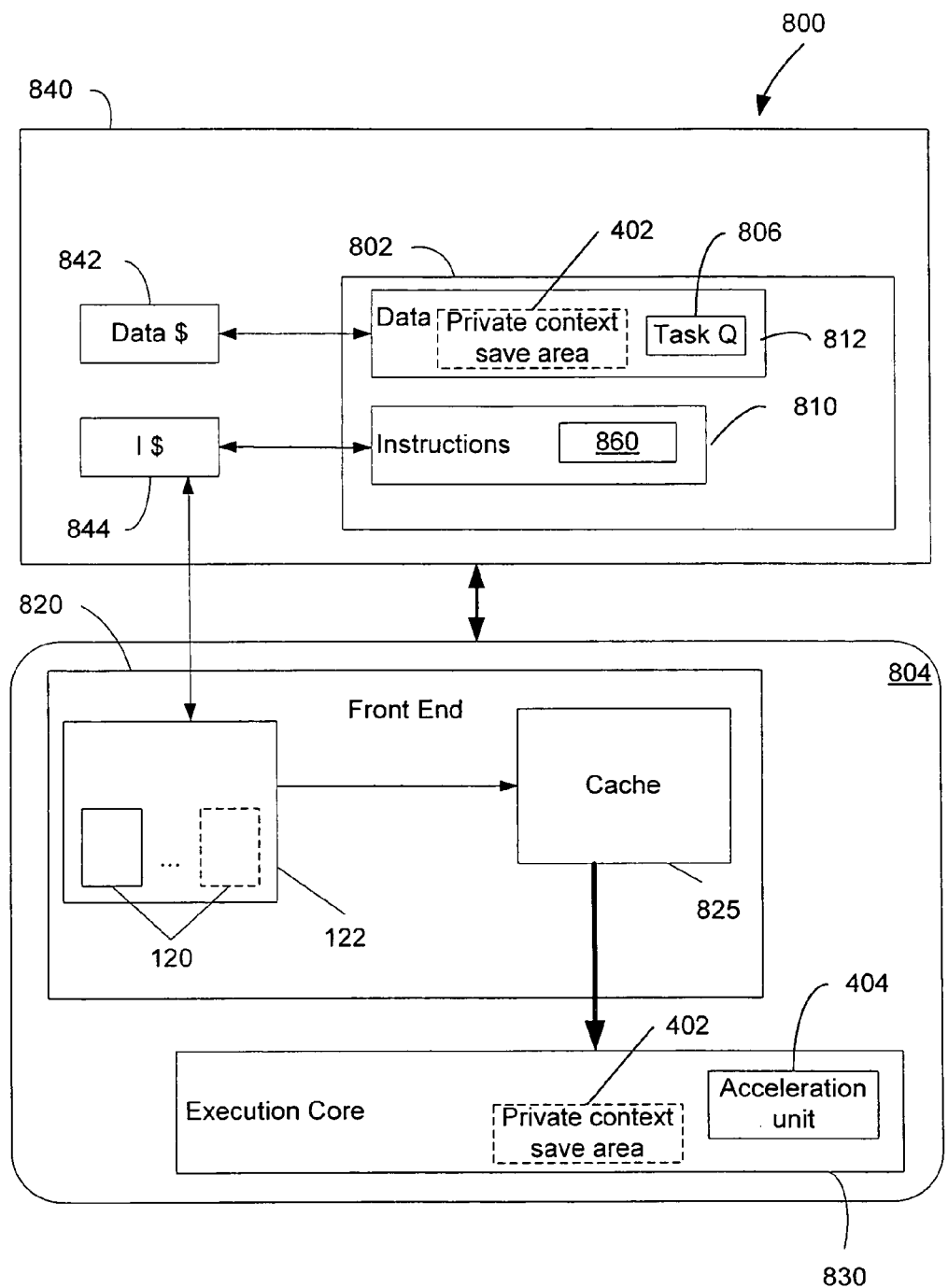
FIG. 8 is a block diagram illustrating at least one embodiment of a system capable of performing disclosed techniques.

FIG. 8 illustrates at least one sample embodiment of a computing system 800 capable of performing disclosed techniques. The computing system 800 includes at least one processor core 804 and a memory system 840. As is explained in connection with FIG. 1, above, the system 800 may alternatively include a plurality of single- or multi-threaded cores (see, e.g., systems 150 and 170 of FIG. 1) rather than a single SMT core 804 as illustrated in FIG. 8

Memory system 840 may include larger, relatively slower memory storage 802, as well as one or more smaller, relatively fast caches, such as an instruction cache 844 and/or a data cache 842. The memory storage 802 may store instructions 810 and data 812 for controlling the operation of the processor 804.

For at least one embodiment, data 812 may include a task queue 806 to hold entries for pending acceleration threads. The data 812 may also include a private context save area 402. As is explained above, the private context save area 402 may instead be implemented as part of a cache, such as data cache 842. For at least one other embodiment, the private context save area 402 is not included in the memory system 840 but is instead included on-die within the processor 804. The optional placement for the private context save area 402 is denoted in FIG. 8 with broken lines.

For at least one embodiment, instructions 810 may include a user-level scheduler routine 860 to schedule user-level threads for execution. For such embodiment, each user-level thread may act also as an acceleration thread, when it is executed on an idle OS thread unit, without the OS being aware of it. In this case, idle OS thread units are dynamically added to the thread units available for execution of user level threads, and stay there as long as the thread unit stays idle from OS perspective.

Memory system 840 is intended as a generalized representation of memory and may include a variety of forms of memory, such as a hard drive, CD-ROM, random access memory (RAM), dynamic random access memory (DRAM), static random access memory (SRAM), flash memory and related circuitry. Memory system 840 may store instructions 810 and/or data 812 represented by data signals that may be executed by processor 804. The instructions 810 and/or data 812 may include code and/or data for performing any or all of the techniques discussed herein.

The processor 804 may include a front end 820 that supplies instruction information to an execution core 830. Fetched instruction information may be buffered in a cache 825 to await execution by the execution core 830. The front end 820 may supply the instruction information to the execution core 830 in program order. The execution core may include an acceleration unit 404 along the lines of that described above in connection with FIGS. 4 and 5.

For at least one embodiment, the front end 820 includes a fetch/decode unit 122 that determines the next instruction to be executed. For at least one embodiment of the system 800, the fetch/decode unit 122 may include a single next-instruction-pointer and fetch logic 120. Such embodiment includes multiple processors 804 (additional processors not shown) to execute additional concurrent threads.

However, in an embodiment where each processor 804 supports multiple concurrent thread contexts, the fetch/decode unit 122 implements distinct next-instruction-pointer and fetch logic 120 for each supported thread context. The optional nature of additional next-instruction-pointer and fetch logic 120 in a multiprocessor environment is denoted by dotted lines in FIG. 8.

Embodiments of the methods described herein may be implemented in hardware, hardware emulation software or other software, firmware, or a combination of such implementation approaches. Embodiments of the invention may be implemented for a programmable system comprising at least one processor, a data storage system (including volatile and non-volatile memory and/or storage elements), at least one input device, and at least one output device. For purposes of this application, a processing system includes any system that has a processor, such as, for example; a digital signal processor (DSP), a microcontroller, an application specific integrated circuit (ASIC), or a microprocessor.

A program may be stored on a storage media or device (e.g., hard disk drive, floppy disk drive, read only memory (ROM), CD-ROM device, flash memory device, digital versatile disk (DVD), or other storage device) readable by a general or special purpose programmable processing system. The instructions, accessible to a processor in a processing system, provide for configuring and operating the processing system when the storage media or device is read by the processing system to perform the procedures described herein. Embodiments of the invention may also be considered to be implemented as a machine-readable storage medium, configured for use with a processing system, where the storage medium so configured causes the processing system to operate in a specific and predefined manner to perform the functions described herein.

Sample system 800 is representative of processing systems based on the Pentium®, Pentium® Pro, Pentium® II, Pentium® III, Pentium® 4, and Itanium® and Itanium® 2 microprocessors available from Intel Corporation, although other systems (including personal computers (PCs) having other microprocessors, engineering workstations, personal digital assistants and other hand-held devices, set-top boxes and the like) may also be used. For one embodiment, sample system may execute a version of the Windows™ operating system available from Microsoft Corporation, although other operating systems and graphical user interfaces, for example, may also be used.

One of skill in the art will recognize that changes and modifications can be made without departing from the present invention in its broader aspects. For example, an embodiment of the method illustrated in FIG. 7 could be performed for an embodiment that stores only pending acceleration threads in the task queue 806. For such embodiment, an acceleration thread may be returned to the task queue (see block 742 of FIG. 7), rather than being dropped, before the thread unit transitions out of the idle state. Such embodiment may employ a mechanism to determine if the acceleration thread has become stale before it is re-scheduled out of the task queue 806.

Also, for example, the acceleration unit 404, including context save logic, context restore logic, logic to determine if a thread unit has become idle, and logic to trigger execution of an acceleration thread, are described above as being implemented, for at least some embodiments, as firmware—instructions stored in micro-code ROM or mini-code software instructions that are triggered by micro-code. However, for alternative embodiments the logic of the acceleration unit 404 may be implemented as traditional software code, as hardware circuitry, or as any combination of software, hardware circuitry, firmware, etc.

Accordingly, one of skill in the art will recognize that changes and modifications can be made without departing from the present invention in its broader aspects. The appended claims are to encompass within their scope all such changes and modifications that fall within the true scope of the present invention.

What is claimed is:

1. A processor comprising:
    a plurality of operating system-managed sequencers to each execute a thread; and
    an acceleration unit to
        detect when an operating system-managed sequencer of the plurality of operating system-managed sequencers is idle in an operating system;
        fetch an acceleration thread from an acceleration thread task queue, wherein a thread to benefit from accelerated execution is to place a pending acceleration thread into the acceleration thread task queue;
        execute the acceleration thread on the operating system-managed sequencer while idle and without intervention of the operating system, wherein the acceleration thread is to execute one or more tasks to accelerate execution of other threads to be executed on other operating system-managed sequencers; and
        drop execution of the acceleration thread when the operating system-managed sequencer is demanded by the operating system.

2. The processor of claim 1 wherein the acceleration unit saves a context of the operating system-managed sequencer prior to execution of the acceleration thread.

3. The processor of claim 2 wherein the acceleration unit restores the context of the operating system-managed sequencer when the operating system-managed sequencer is demanded by the operating system.

4. The processor of claim 1 wherein the acceleration unit determines if any acceleration threads are pending in the task queue.

5. The processor of claim 4 wherein the acceleration unit queries an entry from the task queue to determine a starting address for the acceleration thread.

6. A processor comprising:
    a plurality of operating system-managed sequencers to each execute a thread; and
    an acceleration unit to
        detect when an operating system-managed sequencer of the plurality of operating system-managed sequencers is idle in an operating system;
        fetch an acceleration thread from an acceleration thread task queue, wherein a thread to benefit from accelerated execution is to place a pending acceleration thread into the acceleration thread task queue;
        execute the acceleration thread on the operating system-managed sequencer while idle and without intervention of the operating system, wherein the acceleration thread is to execute one or more tasks to accelerate execution of other threads to be executed on other operating system-managed sequencers; and
        return to an operating system-directed activity when there are no acceleration threads pending in the acceleration thread task queue.

7. The processor of claim 6 wherein the acceleration unit saves a context of the operating system-managed sequencer prior to execution of the acceleration thread.

8. The processor of claim 7 wherein the acceleration unit restores the context of the operating system-managed sequencer prior to the operating system-managed sequencer returning to the operating system-directed activity.

9. The processor of claim 6 wherein the acceleration unit determines if any acceleration threads are pending in the task queue.

10. The processor of claim 9 wherein the acceleration unit queries an entry from the task queue to determine a starting address for the acceleration thread.

11. A method comprising:
    detecting when an operating system-managed sequencer of a plurality of operating system-managed sequencers each executing a thread becomes idle in an operating system;
    fetching an acceleration thread from an acceleration thread task queue, wherein a thread to benefit from accelerated execution is to place a pending acceleration thread into the acceleration thread task queue;
    executing the acceleration thread on the operating system-managed sequencer while idle and without intervention of the operating system, wherein the acceleration thread is to execute one or more tasks to accelerate execution of other threads to be executed on other operating system-managed sequencers;
    detecting when the operating system-managed sequencer is demanded again by the operating system; and
    dropping execution of the acceleration thread when the operating system-managed sequencer is demanded again by the operating system.

12. The method of claim 11 further comprising saving a context of the operating system-managed sequencer prior to executing the acceleration thread.

13. The method of claim 12 further comprising restoring the context of the operating system-managed sequencer when the operating system-managed sequencer is demanded again by the operating system.

14. The method of claim 11 further comprising:
    detecting that the operating system-managed sequencer is not yet demanded again by the operating system;
    determining if an additional acceleration thread is pending; and
    executing the additional acceleration thread on the operating system-managed sequencer while idle in the operating system and without intervention of the operating system.

15. The method of claim 11 further comprising returning to an operating system-directed activity when the operating system-managed sequencer is not yet demanded again by the operating system and no additional acceleration thread is pending.

16. A method comprising:
    detecting when an operating system-managed sequencer of a plurality of operating system-managed sequencers each executing a thread becomes idle in an operating system;
    fetching an acceleration thread from an acceleration thread task queue, wherein a thread to benefit from accelerated execution is to place a pending acceleration thread into the acceleration thread task queue;
    executing the acceleration thread on the operating system-managed sequencer while idle and without intervention of the operating system, wherein the acceleration thread is to execute one or more tasks to accelerate execution of other threads to be executed on other operating system-managed sequencers;

detecting that the operating system-managed sequencer is not demanded again by the operating system; and returning to an operating system-directed activity when there are no acceleration threads pending in the acceleration thread task queue.

17. The method of claim 16 further comprising saving a context of the operating system-managed sequencer prior to executing the acceleration thread.

18. The method of claim 17 further comprising restoring the context of the operating system-managed sequencer after the acceleration thread has completed execution.

19. The method of claim 17 further comprising restoring the context of the operating system-managed sequencer when there are no acceleration threads pending.

20. The method of claim 16 further comprising:
determining if an additional acceleration thread is pending; and
executing the additional acceleration thread on the operating system-managed sequencer while idle in the operating system and without intervention of the operating system.

\* \* \* \* \*